United States Patent [19]

Kooiker

[11] Patent Number: 4,844,531
[45] Date of Patent: Jul. 4, 1989

[54] FOLDING COVER FOR PICKUP BOX

[75] Inventor: John Kooiker, Caledonia, Mich.

[73] Assignee: Steffens Enterprises, Inc., Grand Rapids, Mich.

[21] Appl. No.: 140,533

[22] Filed: Jan. 4, 1988

[51] Int. Cl.$^4$ ............................................. B60P 7/02
[52] U.S. Cl. .................................................. 296/100
[58] Field of Search ................ 296/100, 98, 210, 219; 160/32, 36

[56] References Cited

U.S. PATENT DOCUMENTS 4,406,493  9/1983  Albrecht et al. ................ 296/100
4,418,954  12/1983  Buckley ............................ 296/100

Primary Examiner—James B. Marbert
Attorney, Agent, or Firm—Price, Heneveld, Cooper, DeWitt & Litton

[57] ABSTRACT

The cover for the otherwise open cargo bed of a pickup truck includes a plurality of rectangular panels hinged together laterally of the cargo bed so as to fold forwardly in accordion fashion for storage as a compact stack at the forward end of the bed. The panels are thin whereby the stack has a low silhouette and does not obstruct the rear window of the cab. At least the sides of the cover are enclosed by an upstanding gasket which shields the cover from the vehicle's slip stream and crosswinds which would otherwise make it necessary to provide a tie-down for the cover when in cargo bay closure position.

8 Claims, 3 Drawing Sheets

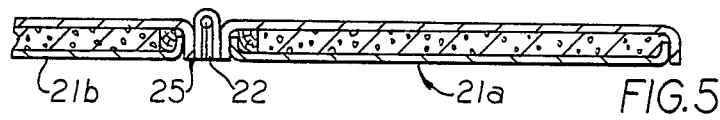
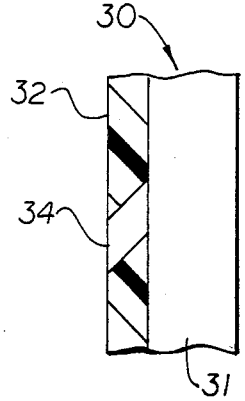
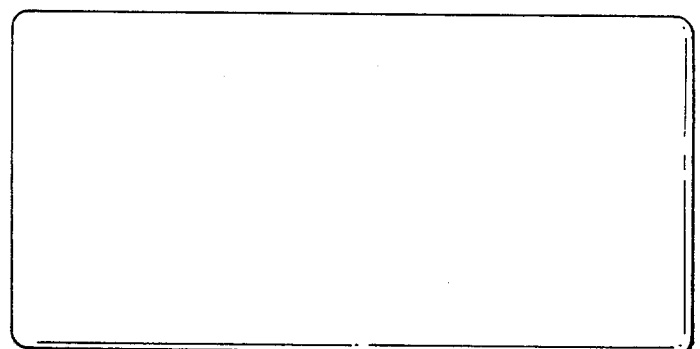
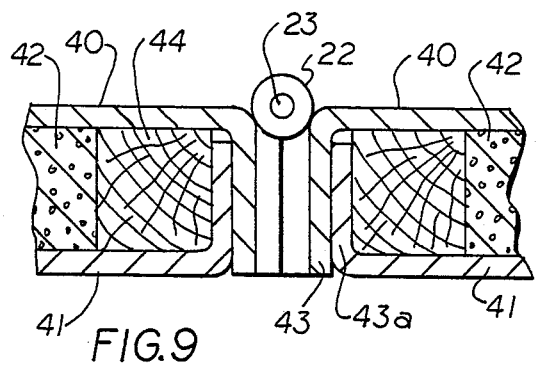
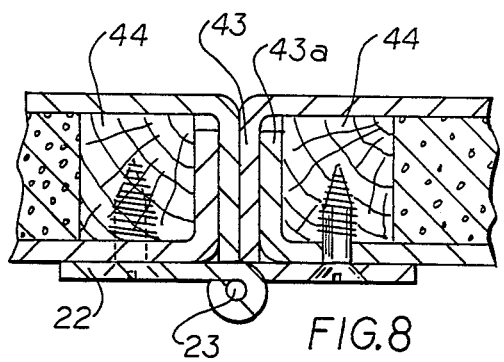
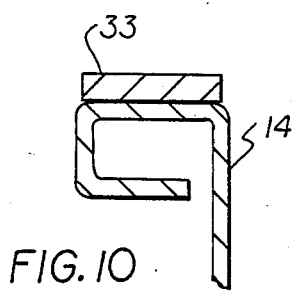
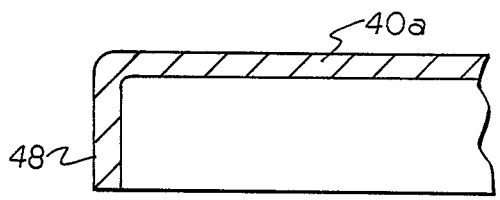
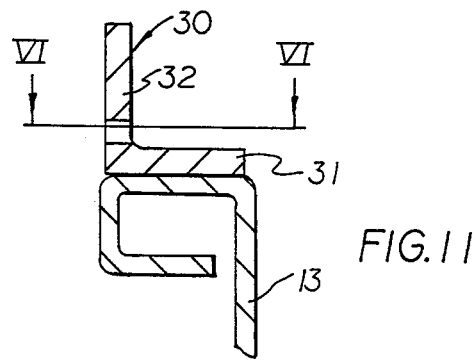

FOLDING COVER FOR PICKUP BOX

FIELD OF THE INVENTION

This invention relates to covers for the cargo bed of a pickup truck, more particularly to such a cover consisting of a plurality of rigid panels which may be folded accordion style to uncover the interior of the cargo space.

BACKGROUND OF THE INVENTION

The cargo space of the conventional pickup truck is open and, therefore, unprotected from the weather. This can be a serious problem in the case of various types of cargo. This problem has been addressed in a number of ways in the past. One solution has been to provide a flexible cover of water tight material such as canvas which has been treated with a moisture sealing material or a plastic. Means are provided on the sides of the cargo space to tie down the cover. In this arrangement, access to the cargo space is attained by detachment and removal of the flexible cover.

Another solution has been to provide a rigid roof structure which is placed over the cargo bay and bolted, clamped or otherwise rigidly secured to the cargo bay. This type of structure normally has a rear door which is positioned above and cooperates with the tailgate of the cargo space. Access to the cargo area of the truck bed is exclusively through the rear opening provided by pivoting the rear door and tailgate panel to open position.

A still further solution has been a flexible cover supported on rigid cross pieces which are mounted on rails secured to the sides of the cargo space for fore and aft movement. This last type of cover can be folded forwardly against the rear wall of the vehicle cab to expose the cargo bay.

Each of these solutions have a number of variations incorporating the basic structural and functional principles described above. All of them have the disadvantage of complexity, operational inconvenience and relatively high cost.

BRIEF DESCRIPTION OF THE INVENTION

The invention provides a plurality of low silhouette panels which are relatively lightweight and can be quickly and easily folded one upon the other, to expose the top of the cargo bay and just as easily be unfolded to cover the cargo bay. Only the forward one of the panels needs to be secured to the vehicle because the low silhouette eliminates the problem of opening of the cover due to lifting of the panels by the vehicle's slip stream even at high speeds. Further, the invention provides a gasket which protects the closed cover from laterally acting forces, such as cross wind, trying to dislocate it sideways. Because of its construction and low silhouette, the individual panels can be relatively lightweight, thus, making it readily maneuverable by a single operator. Because of its low silhouette, even when folded into cargo bay open position, it provides a compact stack which is not or only slightly affected by the vehicle's slip stream and remains below and, thus, does not obstruct the vehicle's rear window.

These and other improvements and advantages of the invention by those skilled in the art of convenience accessories for pickup trucks upon reading the following drawings and description of the invention.

FIG. 5 is a fragmentary sectional view taken along the plane V—V of FIG. 4;

FIG. 6 is an enlarged fragmentary sectional view taken along the plane VI—VI of FIG. 11;

FIG. 7 is a top plan view of one of the panels;

FIG. 8 is an enlarged fragmentary sectional view of the joint between the second and third panels;

FIG. 8A is a fragmentary sectional view of a modified construction for the panel;

FIG. 9 is an enlarged fragmentary view of the joint between the first and second and third and fourth panels;

FIG. 10 is an enlarged fragmentary sectional view of the gasket for the cover as applied to the tailgate;

FIG. 11 is an enlarged fragmentary sectional view of the gasket mounted on one of the side panels;

DESCRIPTION OF THE PREFERRED EMBODIMENT

Figure 1:
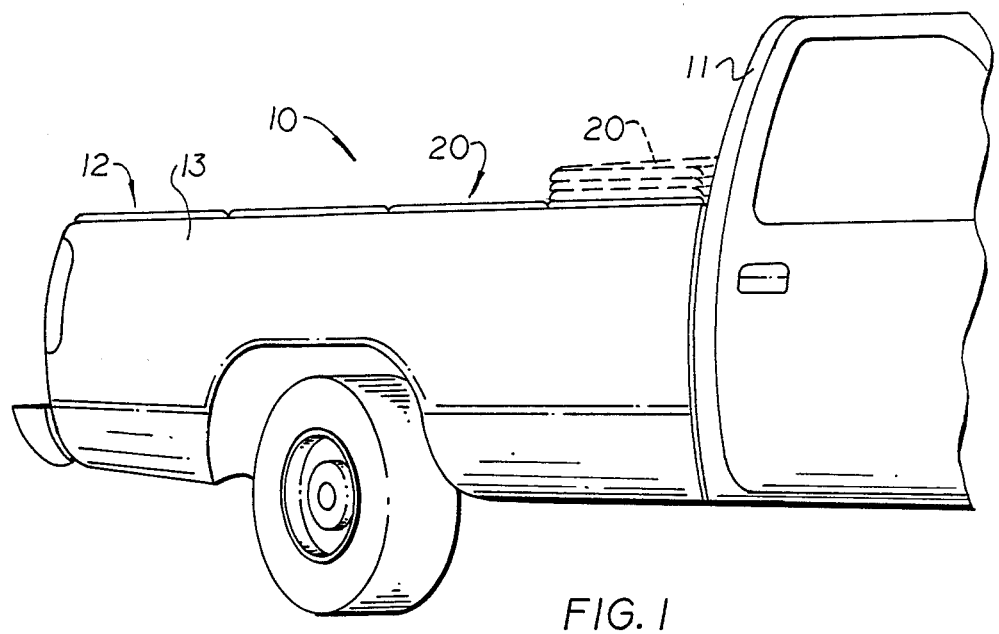
FIG. 1 is a fragmentary oblique side view of a pickup vehicle with the cover of this invention illustrated in extended condition in solid lines (side gasket omitted) and in folded condition in broken lines.
Figure 2:
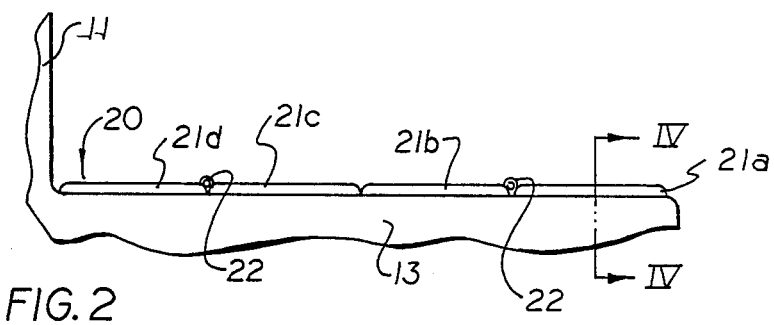
FIG. 2 is a fragmentary side view of the cover in extended condition (with side gasket omitted)
Figure 3:
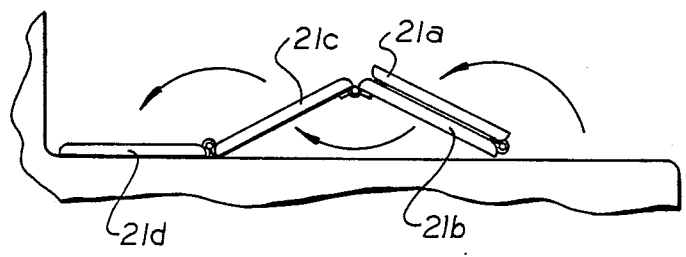
FIG. 3 is a view similar to FIG. 2 illustrating the folding of the cover.
Figure 4:
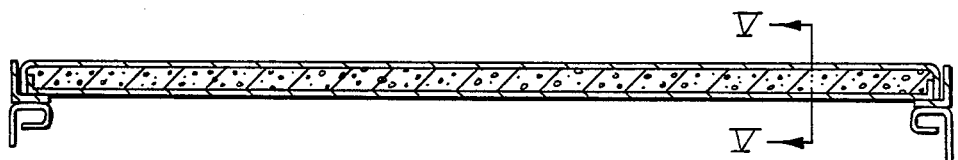
FIG. 4 is a sectional view taken along the plane IV—IV of FIG. 2.
Figure 12:
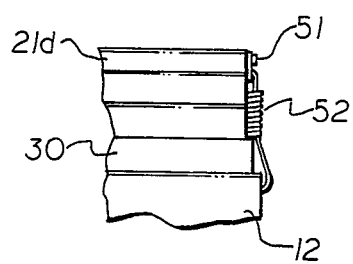
FIG. 12 is a fragmentary side view of the latch for the folded panels.
Figure 13:
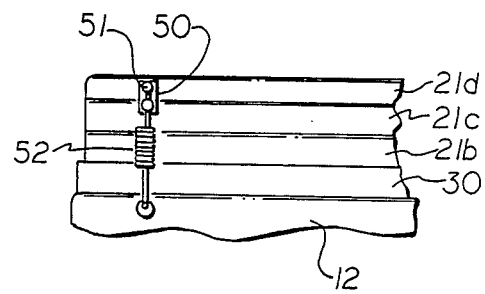
FIG. 13 is a fragmentary front view of the latch illustrated in FIG. 12.
Figure 15:
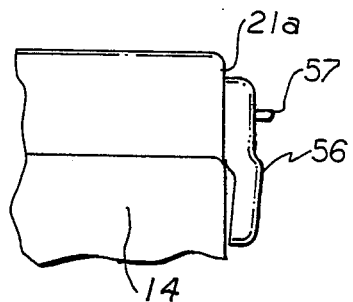
FIG. 15 is a fragmentary side view of the latch illustrated in FIG. 14.
Figure 14:
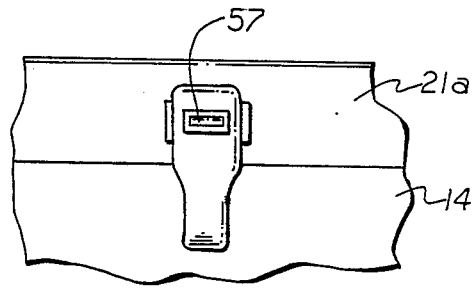
FIG. 14 is a fragmentary rear view of the latch for securing the cover when it is in extended position.

The numeral 10 indicates a conventional pickup truck equipped with a cab 11 and a cargo bed or area 12 having a pair of sides 13 and a fold-down tailgate 14. Mounted over the otherwise open top of the cargo space of the cargo bed is the cover 20 which, in FIG. 1, is illustrated in extended or cargo space closing position in solid lines and in retracted or cargo space open position in broken line (FIG. 1). The cover 20 consists of several, preferably four, identical panels 21a, b and c which are joined to each other by hinges 22. The hinges 22 each have a central pin 23 (FIGS. 8 and 9) about which the leaves of the hinge pivot. The hinges are secured to the covers by suitable fastener means such as screws. The hinges joining panels 21a and 21b and 21c and 21d are arranged with the central pin 23 of the hinge extending along one lateral edge of a panel and centered in the plane of the adjacent surface of the panel. The central pin of the hinge between the panels 21b and 21c is displaced slightly below the lower surface of the panels (FIG. 8). Thus, adjacent panels fold in opposite directions (FIG. 3). The hinges must be such as to permit the panels to lie as close as possible to each other when folded to form a low silhouette, compact stack both to store them below the slip stream generated by the cab 11 and to leave the rear window of the cab unobstructed.

To control the entrance of moisture at the hinges, they are preferably covered by a resilient cover or membrane 25 (FIG. 5), the edges of which are secured between the hinge and the covers. The cover passes around the pin end of the hinge. In the case of the hinge between panels 21b and c, the gasket could be provided between the hinge and the panels.

Along both sides and front of the cover 20, a gasket 30 is provided. The gasket 30 has a bottom leg 31 seated on the top surface of the cargo bed sides 13 (FIG. 11). It is secured to this surface by suitable means, preferably a moisture-proof adhesive which retains its adhesion qualities both during hot, sunny, summer weather and cold, sub-zero winter conditions. As an alternative, it may be secured by suitable fasteners. The other leg 32 of the gasket extends vertically and is positioned close to the sides of the panels. The gasket preferably is of an extruded plastic such as a polyvinyl chloride. The vertical leg 32 should have a height at least equal to that of the cover, preferably its top edge should be flush with the cover.

The hinges 22 having their pins 23 in the plane of the top surface of the panels 20 extend the full width of the panels. However, the hinge 22a (FIG. 8), having its pin below the interior surface of the panels, terminates at the interior edge of the horizontal leg of the gasket 30. This is necessary to eliminate interference with the seating of the panels on the gasket if the hinge extended over the gasket.

The portion 33 of the gasket, extending across the rear panel or tailgate 14 of the cargo space, has no vertical leg because, in this area, only the bottom horizontal leg has any functional necessity.

The portion of the gasket extending across the forward end of the cargo bay may be similar to that used on the tailgate because the vertical leg serves no purpose in this area. However, along the sides of the cargo bay, the vertical leg serves as a wind barrier, shielding the cover from crosswinds and the laterally acting forces of the vehicle's slip stream. This is important because the individual panels of the cover are relatively lightweight to facilitate their being opened and closed by one person.

At suitable intervals, preferably at least two for each panel, the gasket should have weep holes 34 in the gasket's vertical leg which are in the plane of the top surface of the bottom leg 31 (FIGS. 6 and 10). These openings are arranged at an angle inclined rearwardly toward the exterior and are designed to release moisture which accumulates between the cover and the gasket's vertical leg 32. The rearward inclination of the openings is designed to create a Venture type effect for drawing moisture to the outside when the vehicle is in forward motion on the highway.

The panels 20 can have a variety of constructions. A preferable construction is a laminated panel consisting of inner and outer sheets 40 and 41 of 0.019 aluminum bonded to a core 42 of rigid foam of 0.625–1.00 inch thickness. As best seen in FIGS. 8 and 9, the edges of the sheets 40 and 41 are folded to form overlapping flanges 43 and 43a encasing the core. This produces a weather-proof, lightweight, rigid panel. In the areas where it is necessary to secure devices, such as hinges or latches, a wood or composite block or strip 44, such as illustrated in FIG. 8, may be substituted for the foam to provide an anchor for screws. As an alternate construction, a one piece, molded panel 40a with integral sides 48 (FIG. 8A) may be substituted. A polyvinyl material is desirable for this purpose because of its resistance to ultra violet radiation. If the molded plastic construction is used, the panel preferably should have two or more stiffeners which are elongated, narrow recesses extending lengthwise of the panel. These should form inwardly protruding ridges.

A further alternate construction for the panels is a thin sheet of plywood, such as ⅜ inch, with a peripheral frame to operate as a stiffener and two or more interior stiffeners extending lengthwise of the panel. The exterior of the top and sides of the panel can be covered with an aluminum sheet. Irrespective of the construction utilized, the panels should be relatively thin and lightweight to permit one person operation and maintain a low silhouette.

If it is desired to operate the vehicle with the cover folded into storage position, the panels should be secured by suitable tie-down means illustrated in FIGS. 12–16. The tie-downs 49 have a plate 50 with a keyhole type opening to seat over the pin 51 in the edge of the rear, when folded, top panel. The plate is secured to the body of the cargo bay by a resilient member, such as a spring or elastic strap 52. Preferably, two are provided, one adjacent each side of the cargo bay where they are readily accessible.

Figure 16:
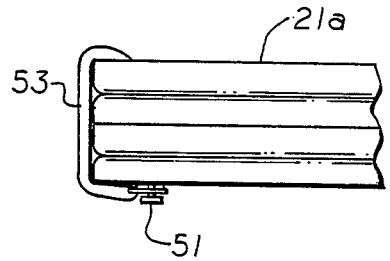
FIG. 16 is a fragmentary side view of the front tie-down for the stored panels.

The rear end of the folded panels can be secured by one or two elastic straps 53 secured to the bottom face of the forward one of the panels and wrapped around the rear face of the stack of panels and detachably anchored to a pin identical to the pin 51 projecting from the inside face of the rear panel (FIG. 16). This construction will firmly hold the stack of folded panels because the bottom or forward panel is firmly secured to the cargo bay by suitable means, such as screws, bolts or the like.

When the panels are unfolded to enclose the cargo bay they can be secured by a conventional latch consisting of a hinged strap 56 secured to the tailgate 14 and a loop 57 secured to the face of the panel. This arrangement makes it possible to lock down the cover using an ordinary padlock.

Having described a preferred embodiment of my invention, together with some modifications thereof, it will be recognized that other modifications may be made without departing from the principles of the invention. Such modifications are to be considered as included in the hereinafter appended claims unless these claims, by their language, expressly state otherwise.

I claim:

1. A low silhouette, fold-back cover for the cargo bed of a pickup truck, said cargo bed having an upstanding front panel, a pair of upstanding side panels and a tailgate, said cover comprising: a plurality of rigid, rectangular cover panels, each having their greater dimension extending laterally of the cargo bed; hinge means connecting adjacent cover panels, the hinge means along one side of a cover panel being arranged with the axis about which it pivots adjacent one face of the cover panel and the axis of pivot of the hinge along the other side of the cover panel being adjacent the opposite face of the cover panel whereby said cover panels can be folded to lie flat upon each other in accordion style for forming a low silhouette, compact, vertical pile at the front end of said cargo bed to provide access to said cargo bed, means securing the forward one of said cover panels to said cargo bed; gasket means of flexible material secured to and overlying the top surface of the front and side panels of said cargo bed, panel engaging seal means on said tailgate, said gasket means being L-shaped in cross-section having one leg secured to the top of said side panels of the cargo bay and underlying the portions of the cover thereabove and a second leg integral with said first leg extending vertically from said first leg substantially the height of said cover, said gasket means providing a seal upon which said cover, when extended, rests; the portions of said gasket extending along the side portions of the cargo bed extending upwardly from said first leg substantially the height of said cover and being closely adjacent the side edges of said panels to form a barrier against crosswind acting on said panels.

2. The fold-back cover as described in claim 1 wherein the height of the second leg is such that its upper edge is flush with the top surface of the panels.

3. A fold-back cover as described in claim 2 wherein the vertical height of each of said panels does not exceed one inch.

4. A fold-back cover as described in claim 2 wherein the gasket secured to the front panel of said cargo bay is identical to the gaskets secured to the side panels thereof; the gasket affixed to the top of the tailgate is a flat member having no upstanding leg.

5. A fold-back cover as described in claim 1 wherein said gasket adjacent its lower edge has drainage openings extending through it for discharge of moisture.

6. A fold-back cover as described in claim 5 wherein said openings are inclined rearwardly in an outward direction to reduce resistance to flow of moisture therethrough when the vehicle is in forward motion.

7. A fold-back cover as described in claim 1 wherein said gasket is L-shaped and has a horizontal leg on which said cover rests and forms a seal, drainage openings through the vertical leg of said gasket at spaced intervals to provide moisture drainage, said openings being flush with the top surface of said horizontal leg; said openings being inclined to extend rearwardly in an outward direction.

8. A low silhouette, fold-back cover for the cargo bed of a pickup truck, said bed having an upstanding front panel, a pair of upstanding side panels and a tailgate, said cover comprising: a plurality of rigid, rectangular cover panels, each having their greater dimension extending laterally of the cargo bed; hinge means connecting adjacent cover panels, the hinge means along one side of a cover panel being arranged with the axis about which it pivots adjacent one face of the cover panel and the axis of pivot of the hinge along the other side of the cover panel being adjacent the opposite face of the cover panel whereby said cover panels can be folded to lie flat upon each other in accordion style forming a low silhouette, compact, vertical pile at the front end of said cargo bed to provide access to said cargo bed, means securing the forward one of said cover panels to said cargo bed; gasket means of flexible material secured to the front and side panels, said gasket along the side portions of the cargo bed extending upwardly to a height such that its upper edge is substantially flush with the top surface of said panels, said height being no more than one inch, said gasket being closely adjacent the side edges of said panels to form a barrier against crosswind acting on said panels.

* * * * *

UNITED STATES PATENT AND TRADEMARK OFFICE
CERTIFICATE OF CORRECTION

PATENT NO. : 4,844,531

DATED : July 4, 1989

INVENTOR(S) : John Kooiker

It is certified that error appears in the above-identified patent and that said Letters Patent is hereby corrected as shown below:

Column 6, Claim 8, Line 7:

After "said" insert -- cargo --.

Signed and Sealed this

Seventh Day of August, 1990

Attest:

HARRY F. MANBECK, JR.

*Attesting Officer*              *Commissioner of Patents and Trademarks*